US012780627B2

(12) United States Patent
Huang et al.

(10) Patent No.: US 12,780,627 B2
(45) Date of Patent: Nov. 3, 2026

(54) JACKING LINKAGE TYPE SIXTEEN-WHEEL FOUR-WAY SHUTTLE

(71) Applicant: LONLINK SMART STORAGE SOLUTION (SHANGHAI) CO., LTD., Shanghai (CN)

(72) Inventors: Xiaoming Huang, Shanghai (CN); Yunlong Ma, Shanghai (CN)

(73) Assignee: LONLINK SMART STORAGE SOLUTION (SHANGHAI) CO., LTD., Shanghai (CN)

( * ) Notice: Subject to any disclaimer, the term of this patent is extended or adjusted under 35 U.S.C. 154(b) by 672 days.

(21) Appl. No.: 18/245,232

(22) PCT Filed: Sep. 15, 2021

(86) PCT No.: PCT/CN2021/118431
§ 371 (c)(1),
(2) Date: Jul. 6, 2023

(87) PCT Pub. No.: WO2022/057816
PCT Pub. Date: Mar. 24, 2022

(65) Prior Publication Data

US 2024/0367957 A1 Nov. 7, 2024

(30) Foreign Application Priority Data

Sep. 15, 2020 (CN) ......................... 202010968454.3

(51) Int. Cl.
*B66F 9/075* (2006.01)
*B66F 9/065* (2006.01)
*B60G 17/015* (2006.01)

(52) U.S. Cl.
CPC .......... *B66F 9/065* (2013.01); *B66F 9/07586* (2013.01); *B60G 17/0152* (2013.01); *B60G 2300/26* (2013.01); *B60G 2500/30* (2013.01)

(58) Field of Classification Search
CPC ..... B65G 1/0492; B65G 1/1373; B66F 9/065; B66F 2700/04; B66F 7/0625
See application file for complete search history.

(56) References Cited

U.S. PATENT DOCUMENTS 11,254,154 B1 * 2/2022 Thammasouk .......... B41J 11/20
2022/0073277 A1 * 3/2022 Ueda .................... B65G 1/0492
(Continued)

FOREIGN PATENT DOCUMENTS

CN 104773494 A 7/2015
CN 208412898 U * 1/2019
(Continued)

OTHER PUBLICATIONS

Chen et al., Four-direction shuttle vehicle, Jun. 14, 2019, EPO, CN 109878995 A, Machine Translation of Description (Year: 2019).*
(Continued)

*Primary Examiner* — James A English
(74) *Attorney, Agent, or Firm* — Ziegler IP Law Group, LLC.

(57) ABSTRACT

A jacking linkage type sixteen-wheel four-way shuttle comprises a support frame, a transverse movement drive mechanism, a longitudinal movement drive mechanism and a cable-stayed reversing jacking mechanism, wherein the transverse movement drive mechanism includes transverse driving wheels, first transverse driven wheels, second transverse driven wheels and third transverse driven wheels; the longitudinal movement drive mechanism includes first longitudinal driving wheels, second longitudinal driving wheels, first longitudinal driven wheels and second longitudinal driven wheels; and, the cable-stayed reversing jacking mechanism includes jacking transverse plates and first/second cable-stayed jacking blocks, in which a ball bearing sleeve is movably arranged in a jacking shaft hole, a cable-stayed jacking pillar is arranged between the front and
(Continued)

rear sides of the ball bearing sleeve, and the first/second cable-stayed jacking blocks are connected with each other through a jacking shaft. The shuttle is a sixteen-wheel two-way moving vehicle which is compact, cost-effective and space saving, and which also greatly improves the carrying capacity and obstacle crossing ability.

10 Claims, 6 Drawing Sheets

(56) References Cited

U.S. PATENT DOCUMENTS

| | | | | |
|---|---|---|---|---|
| 2022/0332503 | A1* | 10/2022 | Flick | G06T 7/70 |
| 2023/0348188 | A1* | 11/2023 | Huang | B65G 1/065 |
| 2026/0054923 | A1* | 2/2026 | Shen | B65G 1/0492 |

FOREIGN PATENT DOCUMENTS

| | | | | | |
|---|---|---|---|---|---|
| CN | 109665247 | A | | 4/2019 | |
| CN | 109878995 | A | * | 6/2019 | |
| CN | 110065759 | A | * | 7/2019 | B65G 1/0492 |
| CN | 210214720 | U | | 3/2020 | |
| CN | 111591659 | A | * | 8/2020 | B65G 1/0492 |
| CN | 112093349 | A | | 12/2020 | |
| DE | 20307005 | U1 | | 8/2003 | |
| EP | 2404847 | A1 | | 1/2012 | |

OTHER PUBLICATIONS

China National Intellectual Property Administration, International Search Report, International Application No. PCT/CN2021/118431, Oct. 28, 2021, 3 pages.

* cited by examiner

JACKING LINKAGE TYPE SIXTEEN-WHEEL FOUR-WAY SHUTTLE

TECHNICAL FIELD

The present disclosure relates to the technical field of four-way shuttles, and in particular, to a jacking linkage type sixteen-wheel four-way shuttle.

BACKGROUND

With a rapid development of warehousing and logistics industry, a three-dimensional warehouse space with a higher utilization rate is required. For the three-dimensional warehouse, it is hoped that more shelves should be arranged in the horizontal direction and more shelf compartments should be arranged in the height direction, so as to minimize the space occupied by incoming and unloading passages.

The current three-dimensional warehouse structure prefers to use a type of one incoming and unloading lane and multiple racking lanes vertically connected to it. Thus, it should be needed that a shuttle must be able to move in two mutually perpendicular directions, longitudinally and transversely. In the prior art, the three-dimensional warehouse usually uses a sub-mother vehicle system, that is, a main vehicle carries a sub-vehicle and moves in the incoming and unloading lane, and then the sub-vehicle drives out in a direction perpendicular to the moving direction of the main vehicle. The sub-vehicle enters in racking lanes, and then goes back along the original line to the main vehicle, and finally is taken away by the main vehicle.

The existing shuttle in the type of the sub-mother vehicle system mostly uses a two-way eight-wheel structure, which has the disadvantages of low carrying capacity, weak obstacle crossing capacity and high failure rate, thus it can not meet the increasingly busy warehousing and logistics needs. Moreover, it generally uses a cam jacking structure, which has the defects of easy wear and tear, uneven force on the follower and low transmission efficiency. In addition, the existing shuttle of the sub-mother vehicle system not only occupies a considerable space, reducing the number of shelves and compartments and the space utilization of the three-dimensional warehouse, but also increases the cost of manufacturing, procurement and maintenance.

SUMMARY

Embodiments of the present disclosure provide a jacking linkage type sixteen-wheel four-way shuttle.

Detailed technical solutions are as follows:

The embodiments of the present disclosure provide a jacking linkage type sixteen-wheel four-way shuttle comprising a support frame, a transverse movement drive mechanism, a longitudinal movement drive mechanism and a cable-stayed reversing jacking mechanism, in which the mechanisms are all mounted on the support frame, wherein:

the transverse movement drive mechanism includes transverse driving wheels, first transverse driven wheels, second transverse driven wheels and third transverse driven wheels, in which each set of the wheels is symmetrically arranged on the front and rear sides of the support frame: and, the two transverse driving wheels are respectively arranged on both ends of a transverse transmission shaft, the two third transverse driven wheels are respectively arranged on both ends of a transverse connecting shaft, and the transverse transmission shaft is drivingly connected to a transverse motor through a first transverse transmission belt;

the longitudinal movement drive mechanism includes first longitudinal driving wheels, second longitudinal driving wheels, first longitudinal driven wheels and second longitudinal driven wheels, in which each set of wheels is symmetrically arranged on the left and right sides of the support frame: and, the first longitudinal driving wheels and the second longitudinal driving wheel on both sides are connected to a longitudinal transmission shaft through first longitudinal transmission belts on the corresponding side, and the longitudinal transmission shaft is drivingly connected to a longitudinal motor through a second longitudinal transmission belt; and, the cable-stayed reversing jacking mechanism includes jacking transverse plates symmetrically arranged on the front and rear sides of the support frame, first cable-stayed jacking blocks respectively arranged at both ends of each jacking transverse plate and second cable-stayed jacking blocks respectively arranged at both ends of each jacking transverse plate: each end of the jacking transverse plate is provided with a first reversing assembling groove and a second reversing assembling groove, to assemble the transverse transmission shaft and the transverse connecting shaft; the structure of the first cable-stayed jacking block is the same as that of the second cable-stayed jacking block, which is provided with a jacking shaft hole penetrating left and right and a jacking inclined hole arranging obliquely and penetrating the front and rear: a ball bearing sleeve is movably arranged in the jacking shaft hole, a cable-stayed jacking pillar is arranged between the front and rear sides of the ball bearing sleeve, and the cable-stayed jacking pillar is movably embedded in the jacking inclined hole: and, the two first cable-stayed jacking blocks is connected through a first jacking shaft which is movably penetrated in its corresponding ball bearing sleeve, the two second cable-stayed jacking blocks is connected through a second jacking shaft which is movably penetrated in its corresponding ball bearing sleeve, and the first jacking shaft and/or the second jacking shaft are drivingly connected to a jacking motor through a jacking transmission belt.

In some embodiments, the front and rear side walls of the support frame are respectively provided with four square mounting holes, and the left and right side walls of the support frame are respectively provided with four circular mounting holes, wherein:

the transverse driving wheels are connected with the transverse transmission shaft which passes through the second reversing assembling groove to assemble into the corresponding square assembling holes; the axles of the first transverse driven wheels and the second transverse driven wheels respectively pass through the corresponding square mounting holes to connect with the corresponding jacking transverse plate; and, the third transverse driven wheels are connected with the transverse connecting shaft which passes through the first reversing assembling groove to assemble into the corresponding square assembling holes; and, the axles of the first longitudinal driving wheels and the second longitudinal driving wheels, which respectively pass through the corresponding circular mounting holes, are connected to the bottom of the support frame through their corresponding first bearing seats: and the first longitudinal driven wheels and the second longitudinal driven wheels are respectively assembled into the corresponding circular assembling holes.

In some embodiments, the transverse driving wheel and the first transverse driven wheel on the same side are connected with each other through a second transverse transmission belt: and/or, the transverse driving wheel and the third transverse driven wheel on the same side are connected with each other through the second transverse transmission belt.

In some embodiments, the jacking linkage type sixteen-wheel four-way shuttle further comprises a tension adjusting mechanism positioned outside the first longitudinal transmission belt, wherein:

the tension adjusting mechanism includes a first tensioning pulley and a second tensioning pulley which are both attached to the outside of the first longitudinal transmission belt, the first tensioning pulley is fixedly arranged on the inner side wall of the support frame through a first fixing plate, and the second tensioning pulley is movably arranged on the inner side wall of the support frame through an adjusting plate.

In some embodiments, the adjusting plate is provided with an adjusting square hole in horizontal, and the adjusting plate is movably fixed to the inner side wall of the support frame by bolts passing through the adjusting square hole: and, one end of the adjusting plate is adjustably connected to a second fixing plate fixed on the inner side wall of the support frame by adjustable nuts and bolts.

In some embodiments, the cable-stayed reversing jacking mechanism further comprises:

second bearing seats, each arranged on the support frame with a bearing arranged at its top to support the first jacking shaft and/or the second jacking shaft; and, jacking nuts, each fixedly sleeved on the corresponding ball bearing sleeve with its front and rear side walls respectively welded and connected to the cable-stayed jacking pillar.

In some embodiments, each jacking transverse plate is slidably connected to corresponding jacking guide posts through guide sliding grooves opened at both ends of the jacking transverse plate, and the jacking guide posts are located at the four corners of the support frame; and, the upper and lower ends of the jacking guide posts are respectively fixedly connected with the support frame through guide post fixing plates.

In some embodiments, the inclination angle of the jacking inclined hole is 5-85°, and the vertical height of the jacking inclined hole is equal to the vertical height of the jacking shaft hole.

In some embodiments, both ends of the first jacking shaft are provided with first synchronous wheels, both ends of the second jacking shaft are provided with second synchronous wheels, and the first synchronous wheels and the second synchronous wheels are connected through a jacking synchronous belt.

In some embodiments, jacking tension wheels are provided on both ends of the jacking synchronous belt which is close to the first synchronous wheels and the second synchronous wheels. The present disclosure achieves the following beneficial effects:

(1) The two first cable-stayed jacking blocks are arranged transversely through the first jacking shaft, the two second cable-stayed jacking blocks are arranged transversely through the second jacking shaft, and the first jacking shaft and the second jacking shaft are in a state of synchronous linkage by the jacking synchronous belt, which improves the lifting consistency of the first cable-stayed jacking blocks and the second cable-stayed jacking blocks, thereby ensuring the stability of the shuttle;

(2) In the present disclosure, the use of eight transverse wheels, eight longitudinal wheels and a reinforced support frame can improve the loading capacity of the shuttle; and the installation position of each wheel is optimized so as to achieve a better obstacle crossing ability;

(3) In order to match up with sixteen wheels, the wheel transmission mechanism is optimized; and, by moving the installation position of the longitudinal transmission shaft upwards and increasing the diameter of the longitudinal wheels, the shuttle can have a better loading capacity;

(4) The tension adjusting mechanism is used to adjust the tension of the first longitudinal transmission belt, while ensuring the stability and continuity of the power transmission of the first longitudinal driving wheels and the second longitudinal driving wheels;

(5) In the cable-stayed reversing jacking mechanism, the cable-stayed jacking blocks contact to the rolling line of the cable-stayed jacking pillar, with high transmission efficiency and no change in the pressure angle; and, the jacking inclined holes on both sides of the jacking block are symmetrically arranged with uniform force. The afore design is novel with compact structure, stable operation, small size and high loading capacity, thereby reducing the maintenance times of the mechanical mechanism so as to have a high work efficiency and a long service life;

(6) The transmission structure with the fitted ball screws and ball bearing sleeves makes the transmission efficiency reach 50%-70%, and the ball bearing sleeves and the jacking shafts are directly connected by jacking nuts, which reduces the loss of kinetic energy; and, (7) The sixteen-wheel four-way shuttle has a compact structure, which not only reduces costs and saves space, but also reduces the overall weight and volume of the shuttle and improves operating capacity and cargo storage efficiency.

BRIEF DESCRIPTION OF THE DRAWINGS

The accompanying drawings described here are provided for further understanding of the present disclosure, and constitute a part of the present disclosure. The exemplary embodiments of the present disclosure and illustrations thereof are intended to explain the present disclosure, but do not constitute inappropriate limitations to the present disclosure. In the drawings.

Figure 1:
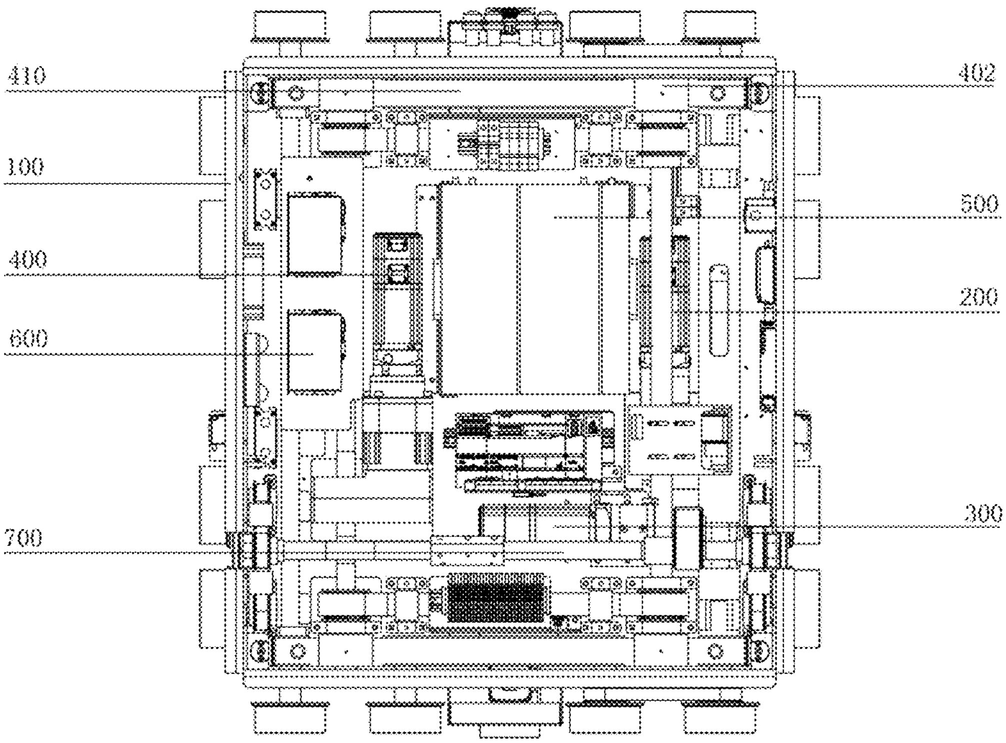
FIG. 1 is a top view diagram of a jacking linkage type sixteen-wheel four-way shuttle according to an embodiment of the present disclosure.

Reference numerals:

100—support frame; 101—square mounting hole(s); 102—circular mounting hole(s); 103—jacking guide post(s); 104—guide post fixing plate(s); 105—first bearing seat(s);

200—transverse movement drive mechanism; 201—transverse driving wheel(s); 202—first transverse driven wheel(s); 203—second transverse driven wheel(s); 204—third transverse driven wheel(s); 205—second transverse transmission belt; 206—transverse transmission shaft; 207—first transverse transmission belt; 208—transverse motor; 209—transverse connecting shaft;

300—longitudinal movement drive mechanism; 301—first longitudinal driving wheel(s); 302—second longitudinal driving wheel(s); 303—first longitudinal driven wheel(s); 304—second longitudinal driven wheel(s); 305—longitudinal transmission shaft; 306—second longitudinal transmission belt; 307—longitudinal motor; 308—first longitudinal transmission belt(s);

400—cable-stayed reversing jacking mechanism; 401—first cable-stayed jacking block(s); 402—second cable-stayed jacking block(s); 403—second bearing seat(s); 404—first jacking shaft; 405—second jacking shaft; 406—jacking synchronous belt; 407—jacking tension wheel(s); 408—jacking transmission belt; 409—jacking motor; 410—jacking transverse plate(s); 411—first reversing assembling groove(s); 412—second reversing assembling groove(s); 413—guide sliding grooves(s); 414—jacking shaft hole(s); 415—jacking inclined hole(s); 416—first synchronous wheel(s); 417—second synchronous wheel(s); 418—ball bearing sleeve(s); 419—jacking nut(s); 420—cable-stayed jacking pillar;

500—battery pack; 600—controller; 700—tension adjusting mechanism; 701—first tensioning pulley(s); 702—first fixing plate(s); 703—second tensioning pulley(s); 704—adjusting plate(s); 705—adjusting square hole(s); 706—second fixing plate(s).

DETAILED DESCRIPTION

To make the objectives, technical solutions, and advantages of the present disclosure clearer, the present disclosure is described below with reference to the accompanying drawings and embodiments. It should be understood that the embodiments described herein are merely used to explain the present disclosure, rather than to limit the present disclosure. All other embodiments obtained by those of ordinary skill in the art based on the embodiments of the present disclosure without creative efforts should fall within the protection scope of the present disclosure.

Apparently, the accompanying drawings in the following description show merely some embodiments of the present disclosure, and a person of ordinary skill in the art may apply the present disclosure to other similar scenarios according to these drawings without creative efforts. In addition, it can also be appreciated that, although it may take enduring and complex efforts to achieve such a development process, for those of ordinary skill in the art related to the present disclosure, some changes such as design, manufacturing or production made based on the technical content in the present disclosure are merely regular technical means, and should not be construed as insufficiency of the present disclosure.

The "embodiment" mentioned in the present disclosure means that a specific feature, structure, or characteristic described in combination with the embodiment may be included in at least one embodiment of the present disclosure. The phrase appearing in different parts of the specification does not necessarily refer to the same embodiment or an independent or alternative embodiment exclusive of other embodiments. It may be explicitly or implicitly appreciated by those of ordinary skill in the art that the embodiment described herein may be combined with other embodiments as long as no conflict occurs.

Unless otherwise defined, the technical or scientific terms used in the present disclosure are as they are usually understood by those of ordinary skill in the art to which the present disclosure pertains. The terms "one", "a", "the" and similar words are not meant to be limiting, and may represent a singular form or a plural form. The terms "include", "contain", "have" and any other variants in the present disclosure mean to cover the non-exclusive inclusion, for example, a process, method, system, product, or device that includes a series of steps or modules (units) is not necessarily limited to those steps or units which are clearly listed, but may include other steps or units which are not expressly listed or inherent to such a process, method, system, product, or device. "Connected", "interconnected", "coupled" and similar words in the present disclosure are not restricted to physical or mechanical connections, but may include electrical connections, whether direct or indirect. The term "multiple" in the present disclosure means two or more. The term "and/or" describes associations between associated objects, and it indicates three types of relationships. For example, "A and/or B" may indicate that A exists alone, A and B coexist, or B exists alone. The character "/" generally indicates that the associated objects are in an "or" relationship. The terms "first", "second", "third" and so on in the present disclosure are intended to distinguish between similar objects but do not necessarily indicate a specific order of the objects.

Referring to FIG. 1, an embodiment of the present disclosure provides a jacking linkage type sixteen-wheel four-way shuttle, comprising a support frame 100, a transverse movement drive mechanism 200, a longitudinal movement drive mechanism 300, a cable-stayed reversing jacking mechanism 400, a battery pack 500 and a controller 600, in which the mechanisms, the battery pack and the controller are all mounted on the support frame 100.

In one example, the support frame 100 is an integral frame formed by the connecting between a bending sheet metal and local reinforcing ribs, which greatly improves the carrying capacity of the shuttle. The battery pack 500 is used as a power source of the shuttle, and the battery pack 500 can use lithium-ion rechargeable batteries, storage batteries or any other energy storage batteries to supply power for each function unit of the shuttle. The controller 600 is a key core component of the whole shuttle, which controls the movement of the shuttle. The controller 600 is electrically connected to the battery pack 500, a transverse motor 208 of the transverse movement drive mechanism 200, a longitudinal motor 307 of the longitudinal movement mechanism 300 and a jacking motor 409 of the cable-stayed reversing jacking mechanism 400. The flexibly longitudinal or transverse movement of the shuttle is controlled by the controller 600, and the jacking and reversing of the vehicle is achieved by the cable-stayed reversing jacking mechanism 400.

Figure 2:
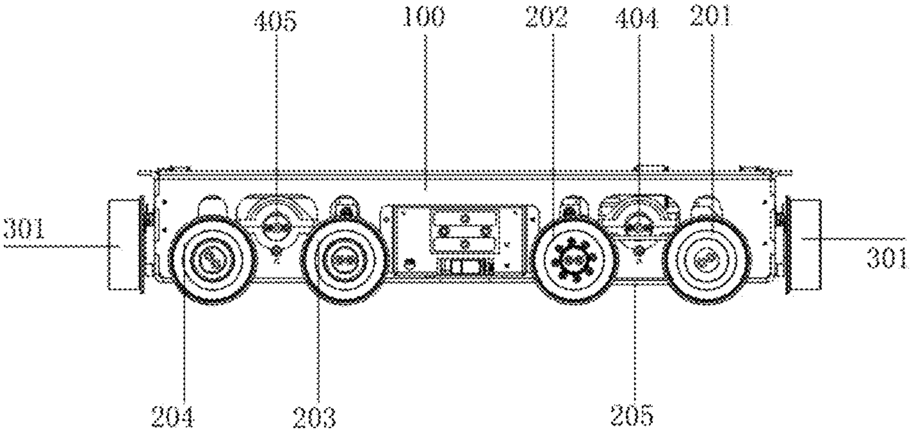
FIG. 2 is a main view diagram of a jacking linkage type sixteen-wheel four-way shuttle according to an embodiment of the present disclosure.
Figure 4:
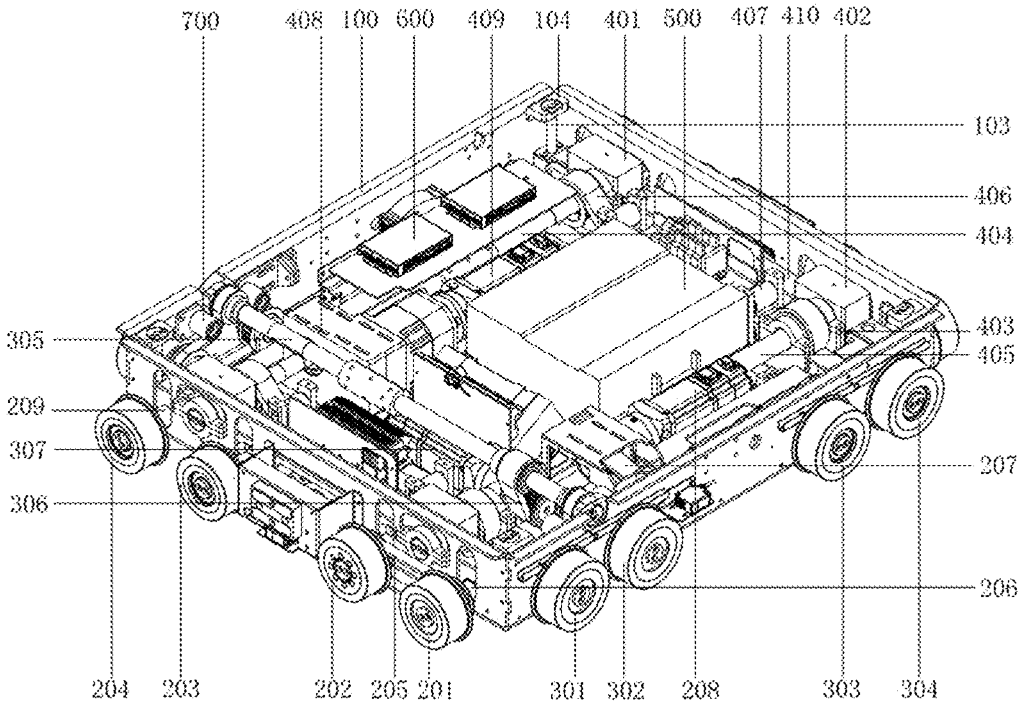
FIG. 4 is a schematic diagram of a three-dimensional structure of a jacking linkage type sixteen-wheel four-way shuttle according to an embodiment of the present disclosure.

In some preferred embodiments, referring to FIG. 2 and FIG. 4, the transverse movement mechanism 200 acts as an execution unit for a transverse movement of the sixteen-wheel four-drive way shuttle. The transverse movement drive mechanism 200 includes transverse driving wheels 201, first transverse driven wheels 202, second transverse driven wheels 203 and third transverse driven wheels 204, in which each set of the wheels is symmetrically arranged on the front and rear sides of the support frame 100. Each set of the wheels has two wheels symmetrically arranged on the front and rear sides of the support frame 100 to form a structure of a one-way eight-wheel vehicle, so as to improve the carrying capacity and the obstacle crossing ability of the vehicle during moving transversely.

In one example, referring to FIG. 2 and FIG. 4, the two transverse driving wheels 201 are respectively arranged on both ends of a transverse transmission shaft 206. The transverse driving wheels 201 at both ends can be driven to rotate through the transverse transmission shaft 206, and the transverse transmission shaft 206 is provided with a transverse coupling. In order to improve the moving stability of the vehicle, the two third transverse driven wheels 204 are connected through a transverse connecting shaft 209 to ensure that the third transverse driven wheels 204 on both sides can run synchronously. Additionally, the transverse transmission shaft 206 is connected to the transverse motor 208 through a first transverse transmission belt 207, the transverse transmission shaft 206 is driven to rotate by the transverse motor 208 through the first transverse transmission belt 207, and the transverse motor 208 is a servo drive motor.

The working principle of the transverse movement drive mechanism 200 in the sixteen-wheel four-way shuttle is as follows: the transverse transmission shaft 206 is driven to rotate by the transverse motor 208 through the first transverse transmission belt 207, the transverse driving wheels 201 at both ends of the transverse transmission shaft 206 are simultaneously driven to rotate; and, the first transverse driven wheels 202, the second transverse driven wheels 203 and the third transverse driven wheels 204 on the support frame 100 are synchronously driven to rotate, so as to realize the transverse moving of the sixteen-wheel four-way shuttle.

Figure 3:
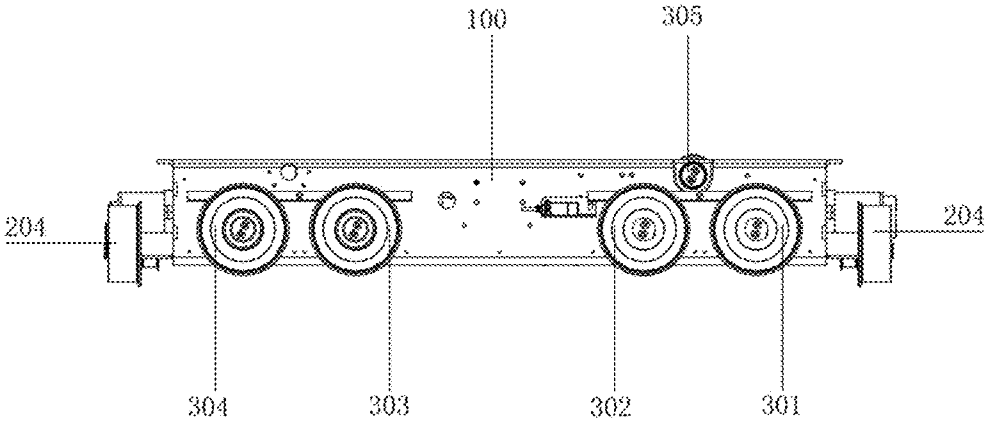
FIG. 3 is a side view diagram of a jacking linkage type sixteen-wheel four-way shuttle according to an embodiment of the present disclosure.

In some preferred embodiments, referring to FIG. 3 and FIG. 4, the longitudinal movement drive mechanism 300 acts as an execution unit for a longitudinal movement of the sixteen-wheel four-way shuttle. The longitudinal movement drive mechanism 300 includes first longitudinal driving wheels 301, second longitudinal driving wheels 302, first longitudinal driven wheels 303 and second longitudinal driven wheels 304, in which each set of the wheels is symmetrically arranged on the left and right sides of the support frame 100. Each set of the wheels has two wheels symmetrically arranged on both sides of the support frame 100 to form a structure of a one-way eight-wheel vehicle, so as to improve the carrying capacity and the obstacle crossing ability of the vehicle during moving longitudinally.

In one example, referring to FIG. 3 and FIG. 4, the first longitudinal driving wheels 301 and the second longitudinal driving wheels 302 on both sides are used as driving wheels and are respectively connected to a longitudinal transmission shaft 305 through first longitudinal transmission belts 308 on both sides, and the longitudinal transmission shaft 305 is connected to the longitudinal motor 307 through a second longitudinal transmission belt 306. The longitudinal transmission shaft 305 is driven to rotate by the longitudinal motor 307 through the second longitudinal transmission belt 306, and the longitudinal motor 307 is a servo drive motor.

In one example, in order to match sixteen wheels, the transmission mechanism of the longitudinal wheels is optimized. The position of the longitudinal transmission shaft 305 is moved up, so that the assembling structure of the longitudinal transmission shaft 305, the first longitudinal driving wheels 301 and the second longitudinal driving wheels 302 can form a triangular structure on its side. On the one hand, the first longitudinal driving wheels 301 and the second longitudinal driving wheels 302 are driven to rotate synchronously through one longitudinal transmission shaft 305. On the other hand, the longitudinal transmission shaft 305 arranged in an elevated position can be well staggered from the cable-stayed reversing jacking mechanism 400 arranged below it, which makes the structure of the shuttle more compact, reasonable and space-saving.

In one example, in order to make the shuttle have a better carrying capacity, the diameter of the eight longitudinal wheels used in the longitudinal movement drive mechanism 300 is larger than the diameter of the eight transverse wheels used in the transverse movement drive mechanism 200. Specifically, the diameters of the transverse driving wheels 201, the first transverse driven wheels 202, the second transverse driven wheels 203 and the third transverse driven wheels 204 are all slightly smaller than the diameters of the first longitudinal driving wheels 301, the second longitudinal driving wheels 302, the first longitudinal driven wheels 303 and the second longitudinal driven wheels 304. The diameter ratio is about 1:1.1-1:1.3; preferably, 1:1.2.

The working principle of the longitudinal movement drive mechanism 300 in the sixteen-wheel four-way shuttle is as follows: the longitudinal transmission shaft 305 is driven to rotate by the longitudinal motor 307 through the second longitudinal transmission belt 306, the first longitudinal driving wheels 301 and the second longitudinal driving wheels 302 at both ends of the longitudinal transmission shaft 305 are simultaneously driven to rotate; and, the first longitudinal driven wheels 303 and the second longitudinal driven wheels 304 on the support frame 100 are synchronously driven to rotate, so as to realize the longitudinal moving of the sixteen-wheel four-way shuttle. Additionally, a longitudinal coupling is arranged on the longitudinal transmission shaft 305. Moreover, the second longitudinal transmission belt 306 will be re-tensioned after working for a period of time, and the adjustment can be achieved by a transverse movement of a tension adjusting mechanism 700 according to the tightness of the pulley.

Figure 7:
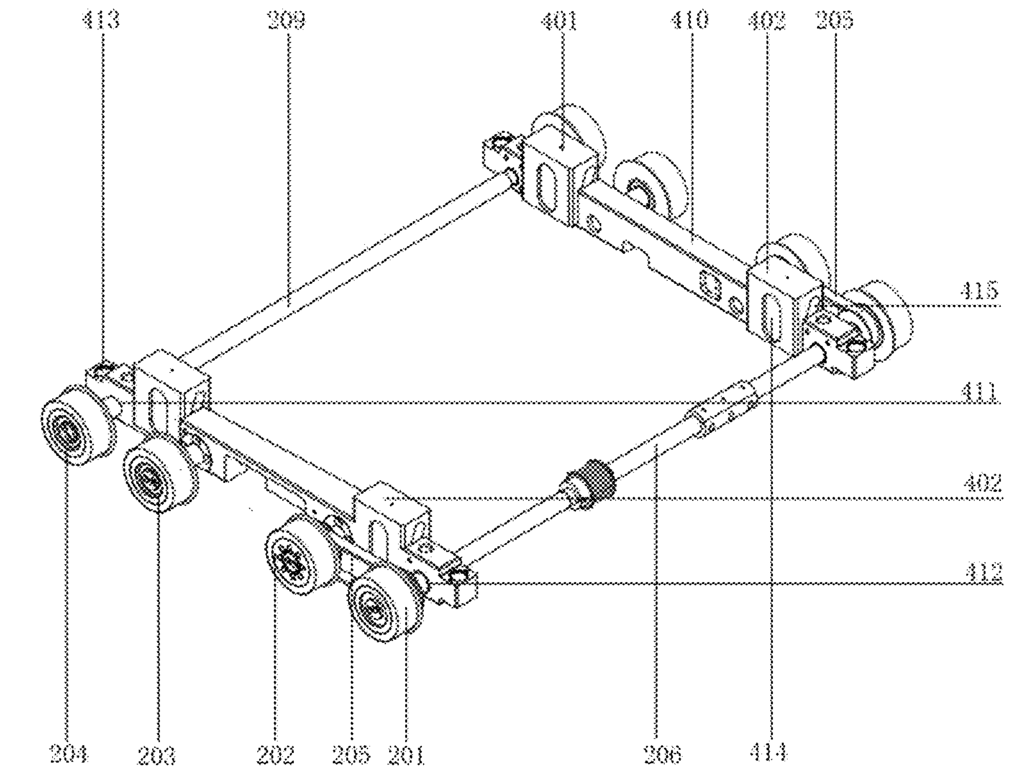
FIG. 7 is a schematic diagram of a partial structure of a cable-stayed reversing jacking mechanism according to an embodiment of the present disclosure.

In some preferred embodiments, referring to FIG. 4 and FIG. 7, the cable-stayed reversing jacking mechanism 400 acts as an execution unit for a jacking and reversing movement of the sixteen-wheel four-way shuttle. The cable-stayed reversing jacking mechanism 400 includes jacking transverse plates 410 symmetrically arranged on the front and rear sides of the support frame 100. First cable-stayed jacking blocks 401 and second cable-stayed jacking blocks 402 respectively arranged at both ends of each jacking transverse plate 410. The first cable-stayed jacking blocks 401 and the second cable-stayed jacking blocks 402 are formed together with the jacking transverse plate 410. The top end surfaces of the first cable-stayed jacking blocks 401 and the second cable-stayed jacking blocks 402 are both higher than the jacking transverse plate 410. The first cable-stayed jacking blocks 401 and the second cable-stayed jacking blocks 402 directly contact with a jacking platform. Both ends of the jacking transverse plate 410 are provided with a first reversing assembling groove 411 and a second reversing assembling groove 412 respectively, to assemble the transverse transmission shaft 206 and the transverse connecting shaft 209. The two ends of the transverse transmission shaft 206 are connected to the transverse driving wheels 201 through the first reversing assembling groove 411, and the two ends of the transverse connecting shaft 209 are connected to the third transverse driving wheels 204 through the second reversing assembling groove 412.

Figure 8:
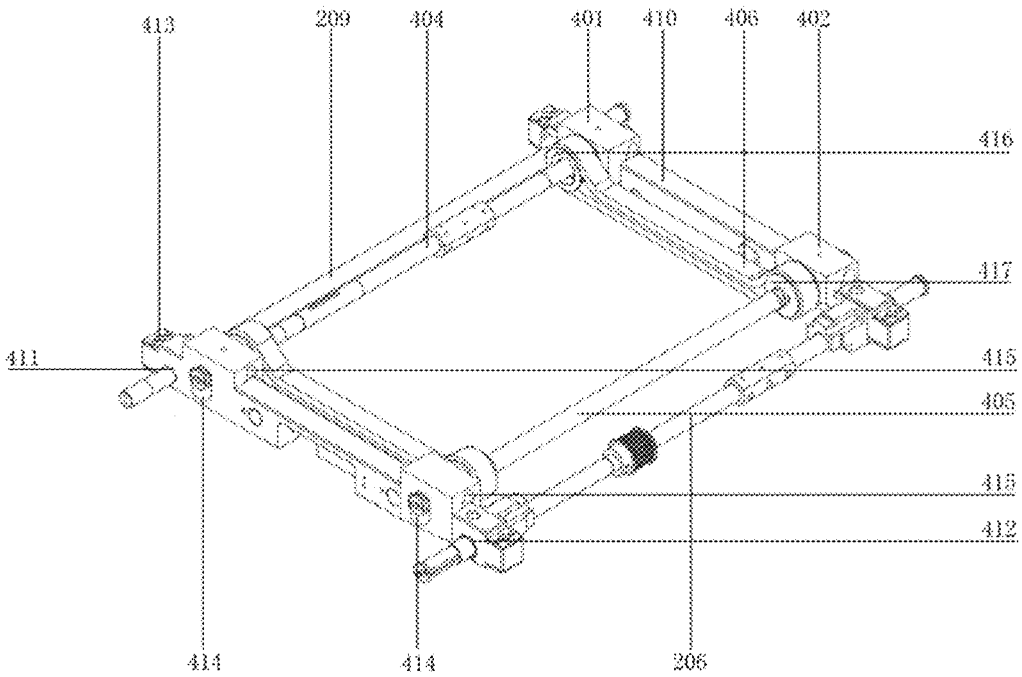
FIG. 8 is a schematic diagram of a integral structure of a cable-stayed reversing jacking mechanism according to an embodiment of the present disclosure.

In one example, referring to FIG. 7 and FIG. 8, the number of the first cable-stayed jacking blocks 401 and the second cable-stayed jacking blocks 402 are both two, which are respectively arranged symmetrically at the front and rear sides of the support frame 100. The structure and working principle of the first cable-stayed jacking blocks 401 and the second cable-stayed jacking blocks 402 are the same. The first cable-stayed jacking blocks 401 and the second cable-stayed jacking blocks 402 are driven by a jacking motor 409 to move up and down relative to the support frame 100. At the same time, the transverse driving wheels 201, first transverse driven wheels 202, second transverse driven wheels 203 and third transverse driven wheels 204 on both sides are driven by the jacking transverse plate 410 to move up and down, to flexibly realize the reversing function of the transverse movement drive mechanism 200 and the longitudinal movement drive mechanism 300.

In one example, referring to FIG. 9, FIG. 10, FIG. 11 and FIG. 12, as an example, the first cable-stayed jacking block 401 is provided with a jacking shaft hole 414 penetrating left and right and a jacking inclined hole 415 arranging obliquely and penetrating the front and rear. A ball bearing sleeve 418 is movably arranged in the jacking shaft hole 414, a cable-stayed jacking pillar 420 is arranged between the front and rear sides of the ball bearing sleeve 418, and the cable-stayed jacking pillar 420 is movably embedded in the jacking inclined hole 415. The two first cable-stayed jacking blocks 401 is connected through a first jacking shaft 404 which is movably penetrated in its corresponding ball bearing sleeve 418, the two second cable-stayed jacking blocks 402 is connected through a second jacking shaft 405 which is movably penetrated in its corresponding ball bearing sleeve 418, and the first jacking shaft 404 and/or the second jacking shaft 405 are drivingly connected to a jacking motor 409 through a jacking transmission belt 408.

The working principle of the cable-stayed reversing jacking mechanism 400 in the sixteen-wheel four-way shuttle is as follows: the first jacking shaft 404 and/or the second jacking shaft 405 are driven to rotate by the jacking motor 409 through the jacking transmission belt 408. The ball bearing sleeves 418 at both ends and the two cable-stayed jacking pillars 420 are driven by the rotation of the first jacking shaft 404 and the second jacking shaft 405 to slide left and right along the jacking shaft hole 414 and the jacking inclined hole 415, and the first cable-stayed jacking blocks 401 and the second cable-stayed jacking blocks 402 are synchronously driven to move up and down. Then, the jacking platform on the top of the first cable-stayed jacking blocks 401 and the second cable-stayed jacking blocks 402 is driven to lift, thereby realizing the jacking and reversing function of the shuttle.

In one example, referring to FIG. 4 and FIG. 7, two ends of the transverse transmission shaft 206 and two ends of the transverse connection shaft 209 are respectively arranged passing through the first reversing assembling grooves 411 and the second reversing assembling grooves 412 at both ends of the corresponding jacking transverse plate 410, so that the transverse transmission shaft 206 and the transverse connection shaft 209 can move up and down synchronously along with the jacking transverse plate 410. Then, the eight transverse wheels of the transverse movement drive mechanism 200, consisting of the transverse driving wheels 201, the first transverse driven wheels 202, the second transverse driven wheels 203 and the third transverse driven wheels 204, are driven to move up and down synchronously relative to the eight longitudinal wheels, so as to leave the ground or contact the ground, thereby realizing the reversing function between the transverse movement drive mechanism 200 and the longitudinal movement drive mechanism 300.

Figure 5:
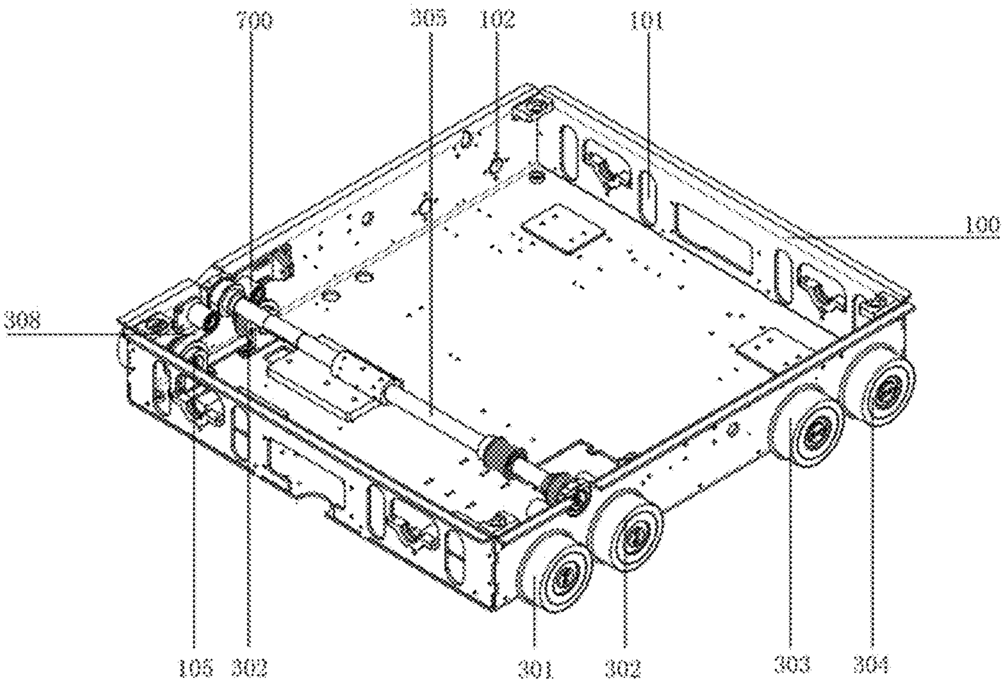
FIG. 5 is a schematic diagram of a support frame according to an embodiment of the present disclosure.

In some preferred embodiments, referring to FIG. 5, the support frame 100 is an integral frame formed by the connecting between a bending sheet metal and local reinforcing ribs. The front and rear side walls of the support frame 100 are respectively provided with four square mounting holes 101 to assemble the transverse wheels, and correspondingly, the left and right side walls of the support frame 100 are respectively provided with four circular mounting holes 102 to assemble the longitudinal wheels.

In one example, referring to FIG. 5 and FIG. 7, the transverse driving wheels 201 on the front and rear sides are connected with the transverse transmission shaft 206 which passes through the second reversing assembling groove 412 to assemble into the corresponding square mounting holes 101; the axles of the first transverse driven wheels 202 and the second transverse driven wheels 203 respectively pass through the corresponding square mounting holes 101 to connect with the corresponding jacking transverse plates 410; and, the third transverse driven wheels 204 are connected with the transverse connecting shaft 209 which passes through the first reversing assembling groove 411 to assemble into the corresponding square mounting holes 101. Moreover, in order to cooperate with the jacking and reversing functions of the cable-stayed reversing jacking mechanism 400, the transverse driving wheels 201, the first transverse driven wheels 202, the second transverse driven wheels 203 and the third transverse driven wheels 204 along with the jacking transverse plates 410 can be lifted between the upper and lower limit positions in the corresponding square mounting holes 101.

Figure 6:
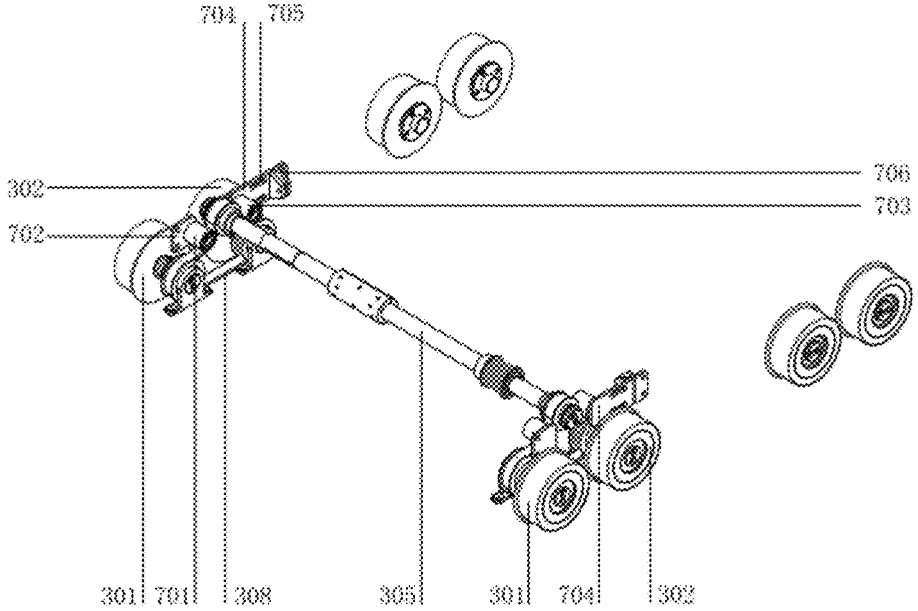
FIG. 6 is an assembly structure diagram of a tension adjusting mechanism according to an embodiment of the present disclosure.

In one example, referring to FIG. 4, FIG. 5 and FIG. 6, the axles of the first longitudinal driving wheels 301 and the second longitudinal driving wheels 302, which respectively pass through the corresponding circular mounting holes 102, are connected to the longitudinal transmission shaft 305. The first longitudinal driving wheels 301 and the second longitudinal driving wheels 302 are driven to rotate synchronously by the longitudinal transmission shaft 305 through the first longitudinal belts 308 to improve the carrying capacity of the shuttle. In addition, the axles of the first longitudinal driving wheels 301 and the second longitudinal driving wheels 302 are respectively arranged passing through the corresponding circular assembling holes 102 and are fixedly connected to the bottom of the support frame 100 through first bearing seats 105, so as to ensure the stability of the first longitudinal driving wheels 301 and the second longitudinal driving wheels 302 during rotating.

In one example, referring to FIG. 3, FIG. 4, FIG. 5 and FIG. 6, the first longitudinal driven wheels 303 and the second longitudinal driven wheels 304 are used as driven wheels, and are driven to move passively by the support frame 100 to mainly have the function of supporting and guiding. The first longitudinal driven wheels 303 and the second longitudinal driven wheels 304 are fixed in the corresponding circular mounting holes 102.

In some preferred embodiments, referring to FIG. 2, FIG. 4 and FIG. 7, the wheel installation structure of the sixteen-wheel four-way shuttle is optimized. The first transverse driven wheels 202 are used as the auxiliary driving wheels of the shuttle, which further improves the transverse gripping ability and obstacle crossing ability of the shuttle. Specifically, the transverse driving wheel 201 and the first transverse driven wheel 202 on the same side are connected with each other through the second transverse transmission belt 205. The power of the transverse driving wheels 201 is transmitted to the first transverse driven wheels 202 through the second transverse transmission belt 205, and the first transverse driven wheels 202 can be driven to rotate synchronously.

In addition, according to the actual operation requirements of the shuttle, the transverse driving wheel 201 and the third transverse driven wheel 204 on the same side are connected with each other through the second transverse transmission belt 205. The third transverse driven wheels 204 are used as a linkage mechanism of the transverse driving wheels 201, thereby further improving the stability, the ground gripping ability and obstacle crossing ability during the transverse moving of the shuttle.

In some preferred embodiments, referring to FIG. 1 and FIG. 5, in order to ensure the stability of the power transmission of the longitudinal movement drive mechanism 300, the sixteen-wheel four-way shuttle further comprises a tension adjusting mechanism 700 positioned outside each of the first longitudinal transmission belt 308. The connection between the first longitudinal transmission belts 308, the first longitudinal driving wheels 301 and the second longitudinal driving wheels 302 is optimized through the tension adjusting mechanism 700, so that the installation of the first longitudinal transmission belts 308 can be more convenient.

In one example, referring to FIG. 6, each tension adjusting mechanism 700 includes a first tensioning pulley 701 and a second tensioning pulley 703 which are both attached to the outside of the corresponding first longitudinal transmission belt 308. The first tensioning pulley 701 is fixedly arranged on the inner side wall of the support frame 100 through a first fixing plate 702. The first tensioning pulley 701 is fixed to be always located between the first longitudinal driving wheels 301 and the longitudinal transmission shaft 305, and to be always in contact with the first longitudinal transmission belt 308. The second tensioning pulley 703 is movably arranged on the inner side wall of the support frame 100 through an adjusting plate 704. With the adjusting function of the adjusting plate 704 to the second tensioning pulley 703, the second tensioning pulley 703 can have a relative displacement to the longitudinal transmission shaft 305, so as to press tightly to fit against the other side end surface of the first longitudinal transmission belt 308 to form a tensioned state for the first longitudinal transmission belt 308. Alternatively, the second tensioning pulley 703 moves away from the longitudinal transmission shaft 305 to separate it from the first longitudinal transmission belt 308, thus the tensioned state of the first longitudinal transmission belt 308 can be eliminated.

In one example, referring to FIG. 6, the adjusting plate 704 is provided with an adjusting square hole 705 in horizontal. The adjusting plate 704, passing through the adjusting square hole 705, is movably fixed to the inner side wall of the support frame 100 by bolts. The adjusting square hole 705 has a certain limiting function under the action of the bolts. The left and right adjustable spacing of the second tensioning pulley 703 is determined by the length of the adjusting square hole 705, to meet the tensioning requirement of the first longitudinal transmission belt 308.

In one example, referring to FIG. 6, a distal end of the adjusting plate 704 is adjustably connected to a second fixing plate 706 by adjustable nuts and bolts. In the presence of adjusting nuts and bolts, the adjusting plate 704 and the second tensioning pulley 703 arranged on the adjusting plate 704 can be controlled to move left and right along the length direction of the adjusting square hole 705, thereby adjusting the tension of the first longitudinal transmission belt 308. The second fixing plate 706 is fixed on the inner side wall of the support frame 100. The adjusting plate 704 and the second fixing plate 706 are both L-shaped plates, and their side end surfaces are arranged oppositely. The adjusting nuts and bolts are located on the oppositely arranged L-shaped plates. The adjustment of the adjusting nuts and bolts can be achieved by the existing conventional structure, which will not be detailed described here.

In one example, referring to FIG. 4, FIG. 7, FIG. 8 and FIG. 9, the cable-stayed reversing jacking mechanism 400 further comprises second bearing seats 403, each of which is arranged on the support frame 100 with a bearing arranged at its top to support the first jacking shaft 404 and the second jacking shaft 405. There are at least two second bearing seats 403 which are respectively disposed at the inner sides of the first cable-stayed jacking blocks 401 and the second cable-stayed jacking blocks 402. The first jacking shaft 404 and the second jacking shaft 405 are both installed in a mounting hole on the upper end of the corresponding second bearing seat 403 through a bearing. The second bearing seat 403 has the functions of stabilizing and supporting the first jacking shaft 404 and the second jacking shaft 405, thus improving the stability of the operation of the cable-stayed reversing jacking assembly. In addition, to further ensure the stability of the cable-stayed reversing jacking mechanism 400, both ends of the first jacking shaft 404 and the second jacking shaft 405 are arranged on the support frame 100 through shaft sleeves.

Figure 11:
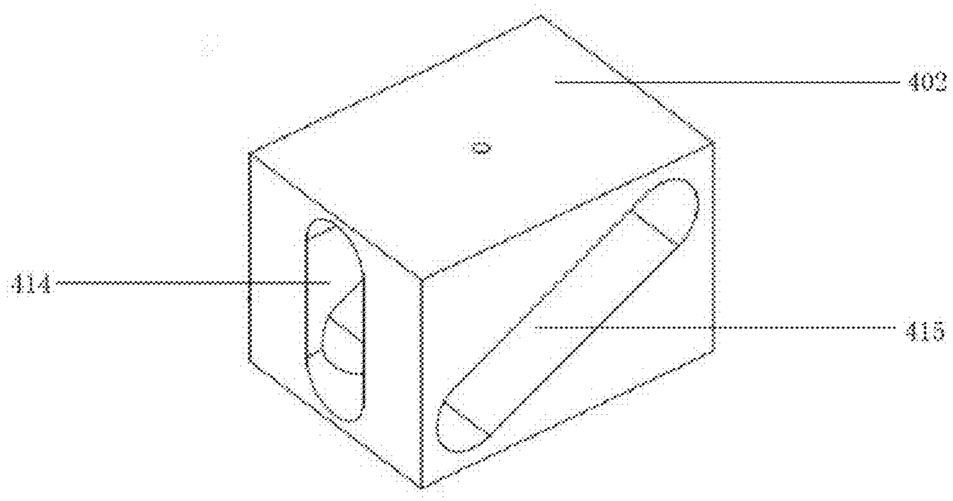
FIG. 11 is a cross-sectional schematic diagram of a ball screw and a ball bearing sleeve according to an embodiment of the present disclosure.
Figure 12:
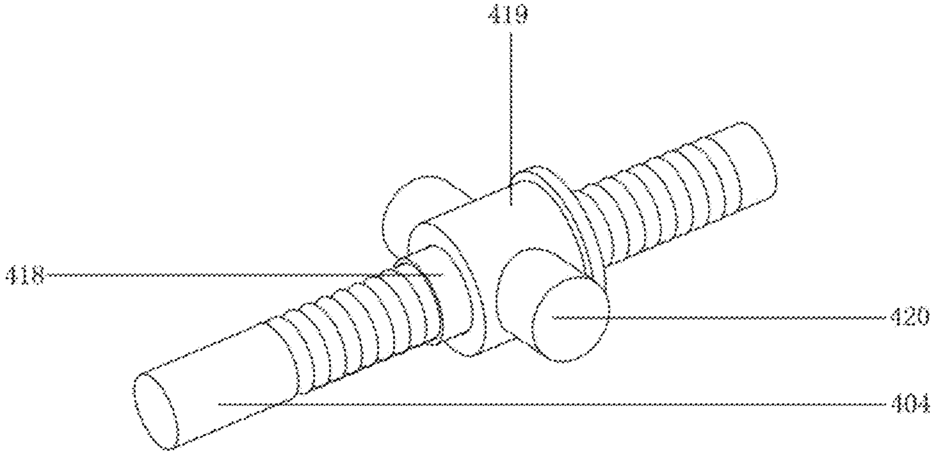
FIG. 12 is a schematic diagram of a cable-stayed jacking block according to another embodiment of the present disclosure.

In one example, referring to FIG. 11 and FIG. 12, the cable-stayed reversing jacking mechanism 400 further comprises jacking nuts 419, each of which is fixedly sleeved on the ball bearing sleeve 418 with its front and rear side walls respectively welded and connected to the cable-stayed jacking pillar 420. The jacking nut 419 is a copper nut, and each jacking nut 419 is fixedly sleeved on the corresponding ball bearing sleeve 418 with a 50%-70% transmission efficiency, which reduces the kinetic energy loss.

In one example, referring to FIG. 4 and FIG. 7, in order to ensure the stability of the cable-stayed reversing jacking mechanism 400 during the jacking and reversing process, each jacking transverse plate 410 is connected to corresponding jacking guide posts 103 by sliding up and down through guide sliding grooves 413, the guide sliding grooves 413 are opened at both ends of the jacking transverse plate 410, and the jacking guide posts 103 are located at the four corners of the support frame 100. Both ends of the jacking transverse plate 410 can slide along the jacking guide posts 103 during lifting, to avoid the defect that the jacking transverse plate 410 sways from side to side during jacking. The upper and lower ends of the jacking guide post 103 are fixedly connected to the support frame 100 through guide post fixing plates 104 respectively. The guide post fixing plates 104 provided at the upper and lower ends simultaneously play a limiting role in the lifting of the jacking transverse plate 410.

In one example, referring to FIG. 11, according to the implementation requirements, different inclination angles of the jacking inclined hole 415 can be designed for different working conditions. The inclination angle of the jacking inclined hole 415 is 5-85°; preferably, 15-75°; more preferably, 25-65°; further preferably, 30-65°; furthermore preferably, 35-65°; most preferably, 40-45°.

Figure 9:
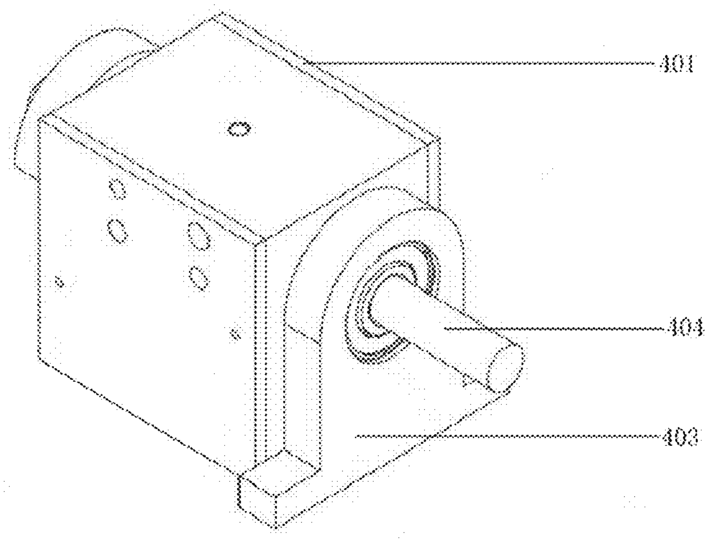
FIG. 9 is a schematic diagram of a cable-stayed jacking block according to an embodiment of the present disclosure.
Figure 10:
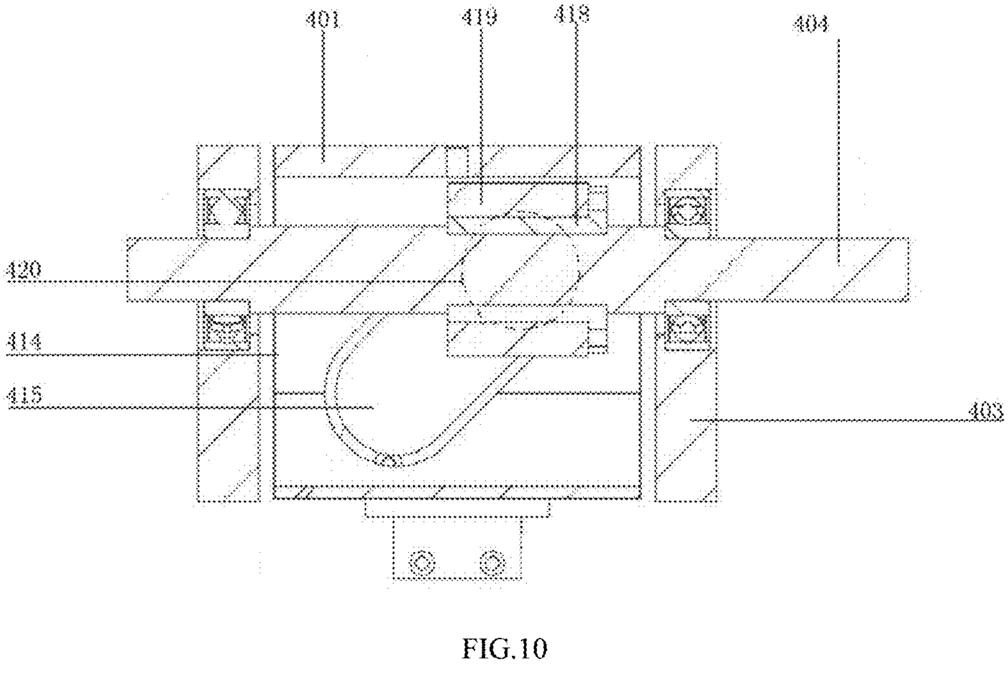
FIG. 10 is a cross-sectional schematic diagram of a cable-stayed jacking block according to an embodiment of the present disclosure.

In one example, referring to FIG. 9 and FIG. 11, the jacking shaft hole 414 is communicated with the jacking inclined hole 415. The shape of the jacking shaft hole 414 and the jacking inclined hole 415 is designed in the structure of an arc slot hole. The vertical height of the jacking shaft hole 414 is equal to the vertical height of the jacking inclined hole 415, so as to synchronously satisfy the requirement of the up and down movement of the first jacking shaft 404 and the second jacking shaft 405 in the jacking shaft hole 414 and the up and down movement of the cable-stayed jacking pillar 420 in the jacking inclined hole 415, during the up and down moving of the jacking blocks.

In one example, referring to FIG. 4 and FIG. 8, in order to ensure the stability of the jacking and reversing process, the transmission stability between the first cable-stayed jacking blocks 401 and the second cable-stayed jacking blocks 402 shall be ensured. Both ends of the first jacking shaft 404 are provided with first synchronous wheels 416, both ends of the second jacking shaft 405 are provided with second synchronous wheels 417, and the first synchronous wheels 416 and the second synchronous wheels 417 are connected through a jacking synchronous belt 406. Jacking tension wheels 407 are provided on both ends of the jacking synchronous belt 406, which are close to the first synchronous wheels 416 and the second synchronous wheels 417. The jacking tension wheels 407 at least have two wheels which are arranged on the upper end face of jacking synchronous belt 406 and have a tensioning function on the jacking synchronous belt 406. Both ends of each jacking tension wheel 407 are fixed on the bottom of the support frame 100 by fixing plates.

The jacking linkage type sixteen-wheel four-way shuttle in the present disclosure uses eight wheels on each side to form a structure of a sixteen-wheel two-way moving vehicle, which greatly improves the carrying capacity and obstacle crossing ability of the vehicle. Using the cable-stayed reversing jacking mechanism, the cable-stayed jacking blocks contact the rolling line of the cable-stayed jacking shaft, which makes the transmission efficiency high with an un-changed pressure angle. The jacking inclined holes on both sides of the jacking block are symmetrically arranged with a uniform force. The structure of the shuttle is novel and compact with stable operation, small size and high carrying capacity, which reduces the maintenance times of the mechanical mechanism so as to have a high working efficiency and a long service life. The jacking linkage type sixteen-wheel four-way shuttle has a compact structure, which not only reduces costs and saves space, but also reduces the overall weight and volume of the shuttle and improves the running capacity and cargo storage efficiency.

Those skilled in the art should understand that, the technical features of the above embodiments can be arbitrarily combined. In an effort to provide a concise description, not all possible combinations of all the technical features of the embodiments are described. However, these combinations of technical features should be construed as disclosed in the description as long as no contradiction occurs.

The above embodiments are merely illustrative of several implementation manners of the present disclosure, and the description thereof is more specific and detailed, but is not to be construed as a limitation to the patentable scope of the present disclosure. It should be pointed out that several variations and improvements can be made by those of ordinary skill in the art without departing from the conception of the present disclosure, but such variations and improvements should fall within the protection scope of the present disclosure. Therefore, the protection scope of the present disclosure should be subject to the protection scope defined by the claims.

What is claimed is:

1. A jacking linkage sixteen-wheel four-way shuttle, comprising a support frame, a transverse movement drive mechanism, a longitudinal movement drive mechanism and a cable-stayed reversing jacking mechanism, in which the mechanisms are all mounted on the support frame, wherein:

the transverse movement drive mechanism includes transverse driving wheels, first transverse driven wheels, second transverse driven wheels and third transverse driven wheels, in which each set of the wheels is symmetrically arranged on a front side and a rear sides of the support frame; and, two transverse driving wheels are respectively arranged on both ends of a transverse transmission shaft, two third transverse driven wheels are respectively arranged on both ends of a transverse connecting shaft, and the transverse transmission shaft is drivingly connected to a transverse motor through a first transverse transmission belt;

the longitudinal movement drive mechanism includes first longitudinal driving wheels, second longitudinal driving wheels, first longitudinal driven wheels and second longitudinal driven wheels, in which each set of wheels is symmetrically arranged on a left side and a right sides of the support frame; and the first longitudinal driving wheels and the second longitudinal driving wheel on both sides are connected to a longitudinal transmission shaft through first longitudinal transmission belts on the corresponding side, and the longitudinal transmission shaft is drivingly connected to a longitudinal motor through a second longitudinal transmission belt; and, the cable-stayed reversing jacking mechanism includes jacking transverse plates symmetrically arranged on the front side and the rear sides of the support frame, a first cable-stayed jacking block arranged at one end of each jacking transverse plate and a second cable-stayed jacking block arranged at another end of each jacking transverse plate; each end of the jacking transverse plate is provided with a first reversing assembling groove and a second reversing assembling groove, to assemble the transverse transmission shaft and the transverse connecting shaft; the structure of the first cable-stayed jacking block is the same as that of the second cable-stayed jacking block, which is provided with a jacking shaft hole penetrating left and right and a jacking inclined hole arranging obliquely and penetrating the front and rear; a ball bearing sleeve is movably arranged in the jacking shaft hole, a cable-stayed jacking pillar is arranged between a front side and a rear sides of the ball bearing sleeve, and the cable-stayed jacking pillar is movably embedded in the jacking inclined hole; and the two first cable-stayed jacking blocks is are connected through a first jacking shaft which is movably penetrated in its corresponding ball bearing sleeve, the two second cable-stayed jacking blocks are connected through a second jacking shaft which is movably penetrated in its corresponding ball bearing sleeve, and the first jacking shaft and/or the second jacking shaft are drivingly connected to a jacking motor through a jacking transmission belt.

2. The jacking linkage sixteen-wheel four-way shuttle according to claim 1, wherein a front side wall and a rear side wall of the support frame are respectively provided with four square mounting holes, and a left side wall and a right side walls of the support frame are respectively provided with four circular mounting holes;

the transverse driving wheels are connected with the transverse transmission shaft which passes through the second reversing assembling groove to assemble into the corresponding square mounting holes; the axles of the first transverse driven wheels and the second transverse driven wheels respectively pass through the corresponding square mounting holes to connect with the corresponding jacking transverse plate;

and the third transverse driven wheels are connected with the transverse connecting shaft which passes through the first reversing assembling groove to assemble into the corresponding square mounting holes; and, axles of the first longitudinal driving wheels and the second longitudinal driving wheels, which respectively pass through the corresponding circular mounting holes, are connected to the bottom of the support frame through their corresponding first bearing seats; and the first longitudinal driven wheels and the second longitudinal driven wheels are respectively assembled into the corresponding circular assembling holes.

3. The jacking linkage sixteen-wheel four-way shuttle according to claim 1, wherein the transverse driving wheel and the first transverse driven wheel on the same side are connected with each other through a second transverse transmission belt; and/or, the transverse driving wheel and the third transverse driven wheel on the same side are connected with each other through the second transverse transmission belt.

4. The jacking linkage sixteen-wheel four-way shuttle according to claim 1, further comprising a tension adjusting mechanism positioned outside the first longitudinal transmission belts, wherein:

the tension adjusting mechanism includes a first tensioning pulley and a second tensioning pulley which are both attached to an outside of the first longitudinal transmission belts, the first tensioning pulley is fixedly arranged on an inner side wall of the support frame through a first fixing plate, and the second tensioning pulley is movably arranged on the inner side wall of the support frame through an adjusting plate.

5. The jacking linkage sixteen-wheel four-way shuttle according to claim 4, wherein the adjusting plate is provided with an adjusting square hole in horizontal, and the adjusting plate is movably fixed to the inner side wall of the support frame by bolts passing through the adjusting square hole; and, one end of the adjusting plate is adjustably connected to a second fixing plate fixed on the inner side wall of the support frame by adjustable nuts and bolts.

6. The jacking linkage sixteen-wheel four-way shuttle according to claim 1, wherein the cable-stayed reversing jacking mechanism further comprises:

second bearing seats, each arranged on the support frame with a bearing arranged at its a top of second bearing seats to support the first jacking shaft-(404) and/or the second jacking shaft; and, jacking nuts (419), each fixedly sleeved on the corresponding ball bearing sleeve with front and rear side walls of the jacking nuts respectively welded and connected to the cable-stayed jacking pillar.

7. The jacking linkage sixteen-wheel four-way shuttle according to claim 1, wherein each jacking transverse plate is slidably connected to corresponding jacking guide posts through guide sliding grooves opened at both ends of the jacking transverse plate, and the jacking guide posts are located at four corners of the support frame; and the upper and lower ends of the jacking guide posts are respectively fixedly connected with the supporting frame through guide post fixing plates.

8. The jacking linkage sixteen-wheel four-way shuttle according to claim 1, wherein an inclination angle of the jacking inclined hole is 5-85°, and a vertical height of the jacking inclined hole is equal to a vertical height of the jacking shaft hole.

9. The jacking linkage sixteen-wheel four-way shuttle according to claim 1, wherein both ends of the first jacking shaft are provided with first synchronous wheels, both ends of the second jacking shaft are provided with second synchronous wheels, and the first synchronous wheels and the second synchronous wheels are connected through a jacking synchronous belt.

10. The jacking linkage sixteen-wheel four-way shuttle according to claim 9, wherein jacking tension wheels are provided on both ends of the jacking synchronous belt which is close to the first synchronous wheels and the second synchronous wheels.

* * * * *